(12) United States Patent
Moisanen

(10) Patent No.: US 11,606,767 B2
(45) Date of Patent: Mar. 14, 2023

(54) USER EQUIPMENT REACHABILITY AFTER NOTIFICATION IN MOBILE COMMUNICATIONS

(71) Applicant: MediaTek Singapore Pte. Ltd., Singapore (SG)

(72) Inventor: Matti Moisanen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/152,714

(22) Filed: Jan. 19, 2021

(65) Prior Publication Data

US 2021/0266856 A1 Aug. 26, 2021

Related U.S. Application Data

(60) Provisional application No. 62/979,487, filed on Feb. 21, 2020.

(51) Int. Cl.
*H04W 60/02* (2009.01)
*H04W 68/02* (2009.01)
*H04W 48/14* (2009.01)

(52) U.S. Cl.
CPC ........... *H04W 60/02* (2013.01); *H04W 48/14* (2013.01); *H04W 68/02* (2013.01)

(58) Field of Classification Search
None
See application file for complete search history.

(56) References Cited

U.S. PATENT DOCUMENTS

| 2019/0394833 | A1 | 12/2019 | Talebi Fard et al. | |
| 2020/0336948 | A1* | 10/2020 | Kawasaki | H04W 36/0022 |
| 2020/0336953 | A1* | 10/2020 | Liu | H04W 48/02 |
| 2021/0153286 | A1* | 5/2021 | Park | H04W 28/24 |

OTHER PUBLICATIONS

Taiwan Intellectual Property Office, Office Action for Patent Application No. 110105645, dated Feb. 10, 2022.

* cited by examiner

*Primary Examiner* — Mazda Sabouri
(74) *Attorney, Agent, or Firm* — Han IP PLLC; Andy M. Han

(57) ABSTRACT

Examples pertaining to user equipment (UE) reachability after notification in mobile communications are described. An apparatus (e.g., UE) receives an indication to initiate a notification procedure from a network over a non-$3^{rd}$ Generation Partnership Project (non-3GPP) access while a 3GPP access with the network is unavailable. In response, the apparatus transmits a notification response message to the network. After the 3GPP access with the network becomes available, the apparatus indicates to the network that the apparatus is reachable over the 3GPP access.

19 Claims, 5 Drawing Sheets

300

RECEIVE, BY AN APPARATUS, AN INDICATION TO INITIATE A NOTIFICATION PROCEDURE FROM A NETWORK OVER A NON-3$^{RD}$ GENERATION PARTNERSHIP PROJECT (NON-3GPP) ACCESS WHILE A 3GPP ACCESS WITH THE NETWORK IS UNAVAILABLE
310

TRANSMIT A NOTIFICATION RESPONSE MESSAGE TO THE NETWORK RESPONSIVE TO THE RECEIVING
320

AFTER THE 3GPP ACCESS WITH THE NETWORK BECOMES AVAILABLE, INDICATE TO THE NETWORK THAT THE APPARATUS IS REACHABLE OVER THE 3GPP ACCESS
330

```
┌─────────────────────────────────────────────┐
│ RECEIVE, BY AN APPARATUS, AN INDICATION TO  │
│ INITIATE A NOTIFICATION PROCEDURE FROM A    │
│ NETWORK OVER A NON-3RD GENERATION           │
│ PARTNERSHIP PROJECT (NON-3GPP) ACCESS       │
│ WHILE A 3GPP ACCESS WITH THE NETWORK IS     │
│ UNAVAILABLE                                 │
│ 410                                         │
└─────────────────────────────────────────────┘
                      │
                      ▼
┌─────────────────────────────────────────────┐
│ TRANSMIT A NOTIFICATION RESPONSE MESSAGE    │
│ TO THE NETWORK RESPONSIVE TO THE RECEIVING  │
│ 420                                         │
└─────────────────────────────────────────────┘
                      │
                      ▼
┌─────────────────────────────────────────────┐
│ AFTER THE 3GPP ACCESS WITH THE NETWORK      │
│ BECOMES AVAILABLE, TRANSMIT AN INDICATION   │
│ MESSAGE TO THE NETWORK OVER THE NON-3GPP    │
│ ACCESS THAT THE APPARATUS IS REACHABLE      │
│ OVER THE 3GPP ACCESS                        │
│ 430                                         │
└─────────────────────────────────────────────┘
```

FIG. 4

USER EQUIPMENT REACHABILITY AFTER NOTIFICATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/979,487, filed on 21 Feb. 2020, the content of which being incorporated by reference in its entirety.

TECHNICAL FIELD

The present disclosure is generally related to mobile communications and, more particularly, to user equipment (UE) reachability after notification in mobile communications.

BACKGROUND

Unless otherwise indicated herein, approaches described in this section are not prior art to the claims listed below and are not admitted as prior art by inclusion in this section.

In wireless communications, including mobile communications in accordance with the $3^{rd}$ Generation Partnership Project (3GPP) specification(s) and/or wireless local area networking in accordance with the Institute of Electrical and Electronics Engineers (IEEE) 802.11 specification(s), a network may initiate a notification procedure over a non-3GPP access when a UE is in a $5^{th}$ Generation (5G) Mobility Management (5GMM) connected (5GMM-CONNECTED) mode over the non-3GPP access while in a 5GMM idle (5GMM-IDLE) mode over a 3GPP access. The network may do so to command the UE to switch to the 5GMM-CONNECTED mode over the 3GPP access. The notification procedure may be initiated by the Session Management Function (SMF) of the network, for example, when there is downlink (DL) data for a protocol data unit (PDU) session associated with the 3GPP access to be transferred over the 3GPP access. In case the UE is unable to start connection establishment over the 3GPP access (e.g., due to it being in a NO-CELL-AVAILABLE state or in another state where establishment is impossible), the UE would need to send a NOTIFICATION RESPONSE message to the Access and Mobility Management Function (AMF) of the network over the non-3GPP access to indicate such a failure (e.g., per 3GPP Technical Specification (TS) 24.501 section 5.6.3). Upon receiving the NOTIFICATION RESPONSE message, the AMF would notify the SMF that the UE is unreachable, and the SMF would refrain from requesting DL data transfer from the AMF to the UE while the UE is unreachable (e.g., per 3GPP TS 23.502 section 4.2.3.3). Later, the AMF would indicate to the SMF when the UE becomes reachable (e.g., when the UE enters a connection management connected (CM-CONNECTED) mode over the 3GPP access.

However, it is unknown and uncertain when, after the UE has sent the NOTIFICATION RESPONSE message, the UE would enter the CM-CONNECTED mode and return to a state where it is reachable but does not need a non-access stratum (NAS) signaling connection. For instance, in case the UE was in the state of 5GMM-REGISTERED.NO-CELL-AVAILABLE with respect to the 3GPP access when it sent the NOTIFICATION RESPONSE message over the non-3GPP access, and the UE camps on a cell which belongs to a tracking area (TA) which is included in a registered TA list, then the UE would enter the state of 5GMM-REGISTERED.NORMAL-SERVICE and does not initiate connection establishment. The AMF would not be aware that the UE is reachable again and, hence, would not notify the SMF that the UE is reachable, and accordingly the SMF would still refrain from initiating any DL data transfer. Undesirably, this would cause additional delay before the SMF is able to send DL data again.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to UE reachability after notification in mobile communications. It is believed that the above-described issue would be avoided or otherwise alleviated by implementing one or more of the proposed schemes described herein.

In one aspect, a method may involve a processor of an apparatus receiving an indication to initiate a notification procedure from a network over a non-3GPP access while a 3GPP access with the network is unavailable. The method may also involve the processor transmitting a notification response message to the network responsive to the receiving. The method may further involve the processor, after the 3GPP access with the network becomes available, indicating to the network that the apparatus is reachable over the 3GPP access.

In another aspect, a method may involve a processor of an apparatus receiving an indication to initiate a notification procedure from a network over a non-3GPP access while a 3GPP access with the network is unavailable. The method may also involve the processor transmitting a notification response message to the network responsive to the receiving. The method may further involve the processor, after the 3GPP access with the network becomes available, transmitting an indication message to the network over the non-3GPP access that the apparatus is reachable over the 3GPP access.

In yet another aspect, a method may involve a processor of an apparatus receiving an indication to initiate a procedure from a network over a first type of access while a second type of access with the network is unavailable. The method may also involve the processor transmitting a response message to the network responsive to the receiving. The method may further involve the processor, after the second type of access with the network becomes available, indicating to the network that the apparatus is reachable over the second type of access regardless of a need for signaling over the second type of access.

It is noteworthy that, although description provided herein may be in the context of certain radio access technologies, networks and network topologies such as 5G/New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a flowchart of an example process in accordance with an implementation of the present disclosure.

FIG. 4 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE reachability after notification in mobile communications. According to the present disclosure, a number of possible solutions may be implemented separately or jointly. That is, although these possible solutions may be described below separately, two or more of these possible solutions may be implemented in one combination or another.

Figure 1:
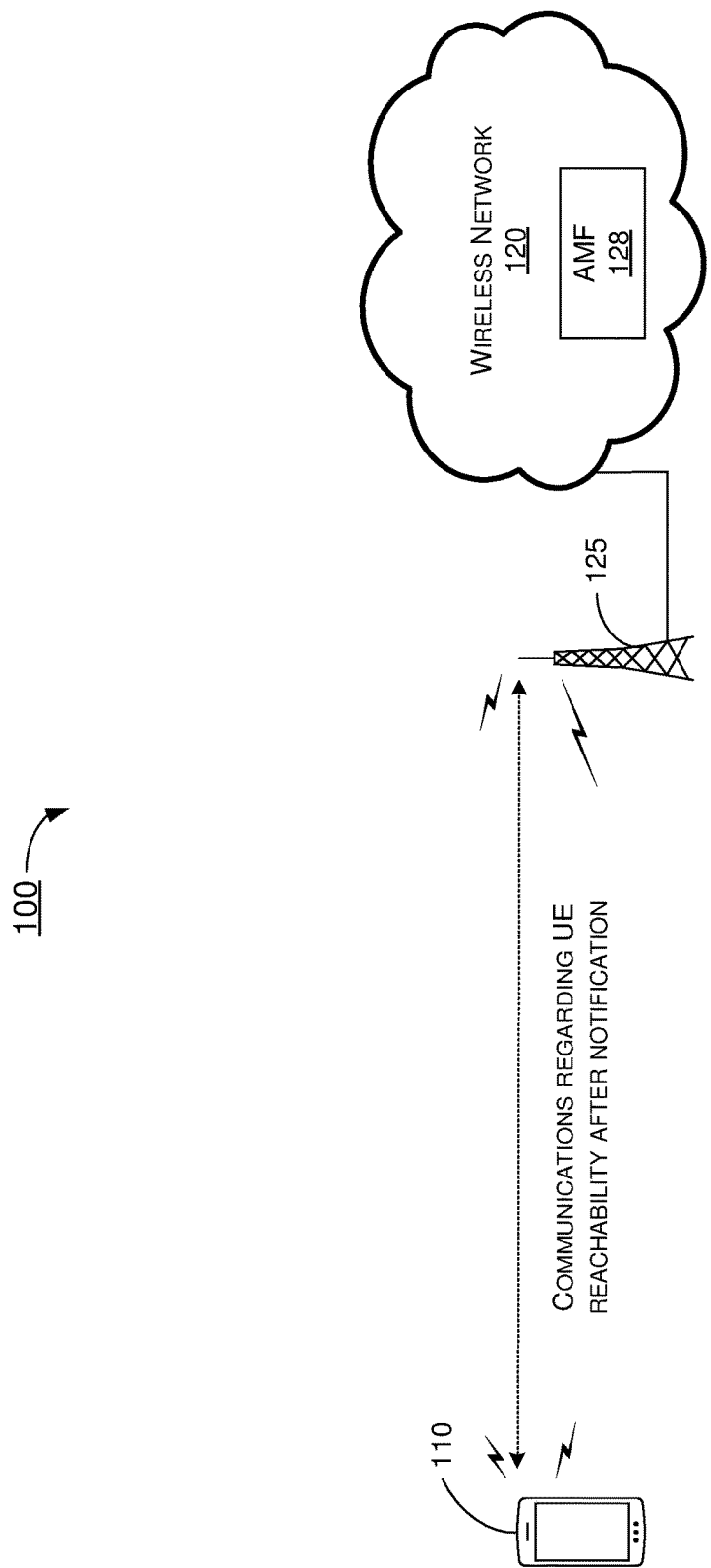
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 and a wireless network 120 (which may include a 5G NR mobile network) which may include one or more servers 128 on which AMF may be executed or otherwise implemented. Depending on channel condition, availability and/or other factor(s), UE 110 may be in wireless communication with wireless network 120 via either or both of a 3GPP access and a non-3GPP access through a network node 125. In network environment 100, UE 110 and wireless network 120 may implement various schemes pertaining to UE reachability after notification in mobile communications in accordance with the present disclosure, as described herein. It is noteworthy that the term "3GPP access" herein refers to one or more accesses or wireless connections in accordance with one or more 3GPP specifications, protocols and/or standards (e.g., 5G/NR, LTE, LTE-Advanced and/or LTE-Advanced Pro) and the term "non-3GPP" access herein refers to one or more accesses or wireless connections in accordance with one or more non-3GPP specifications, protocols and/or standards (e.g., Wi-Fi as defined in IEEE 802.11ax/be, Bluetooth, infrared, Near-Field-Communication (NFC), ZigBee and the like).

Under a first proposed scheme in accordance with the present disclosure, in case that UE 110 has sent a NOTIFICATION RESPONSE message to wireless network 120, UE 110 may perform certain operations. Firstly, UE 110 may memorize (e.g., by storing related data or information in a memory or storage) that a notification procedure has been performed and that UE 110 has sent the NOTIFICATION RESPONSE message to wireless network 120. Secondly, when the 3GPP access becomes available, UE 110 may initiate a connection establishment procedure over the 3GPP access when it is possible for the next time regardless of a need to connect to wireless network 120 via the 3GPP access. That is, UE 110 may initiate the connection establishment procedure (e.g., by initiating a registration procedure or a service request procedure) even when there is no reason or need to do so. For instance, under the first proposed scheme UE 110 would still initiate a connection establishment procedure over the 3GPP access when mobility or periodic registration update is not required and UE 110 does not have uplink (UL) signaling or data to be transmitted.

As an example of implementation of the first proposed scheme, UE 110 may have transmitted a NOTIFICATION RESPONSE message to wireless network 120 over the non-3GPP access in response to a notification procedure initiated by wireless network 120 over the non-3GPP access when UE 110 was in the 5GMM-CONNECTED mode over the non-3GPP access while in the 5GMM-IDLE mode over the 3GPP access (e.g., due to the 3GPP access being not available or otherwise out of service). Later, when UE 110 enters the state of 5GMM-REGISTERED.NORMAL-SERVICE over the 3GPP access, UE 110 may initiate a registration procedure for mobility and periodic registration update by transmitting a REGISTRATION REQUEST message to AMF 128 of wireless network 120 via network node 125.

Under a second proposed scheme in accordance with the present disclosure, in case that UE 110 has sent a NOTIFICATION RESPONSE message to wireless network 120, UE 110 may perform certain operations. Firstly, UE 110 may memorize (e.g., by storing related data in a data storage or memory) that a notification procedure has been performed and that UE 110 has sent the NOTIFICATION RESPONSE message. Additionally, UE 110 may indicate that the 3GPP access is reachable again by sending a message over the non-3GPP access. It is believed that this would save signaling when a 3GPP access connection establishment and signaling is not performed. This is especially so as, in typical cases, the original DL data would have been discarded and possibly the 3GPP access/connection is not required for DL signaling or data transfer. Under the second proposed scheme, UE 110 may transmit the NOTIFICATION RESPONSE message with a new or modified existing information element (IE) indicating that the 3GPP access has returned to a state where it is reachable. Alternatively, UE 110 may transmit some other existing message which may be extended or otherwise modified to be used for this purpose. Still alternatively, a new message type may be defined to be used for this purpose.

Under a third proposed scheme in accordance with the present disclosure, either the first proposed scheme or the second proposed scheme may be utilized depending on the situation. For instance, in case the non-3GPP access is in a CONNECTED mode, the second proposed scheme may be utilized by UE 110 to indicate to wireless network 120 that UE 110 is reachable over the 3GPP access even when UE 110 has no need of NAS signaling. Moreover, in case the non-3GPP access is in an IDLE mode when the 3GPP access becomes available again, the first proposed scheme may be utilized by UE 110 to indicate to wireless network 120 that UE 110 is reachable over the 3GPP access even when UE 110 has no need of NAS signaling. Under the third proposed scheme, a mechanism (e.g., a timer) may be utilized to control a duration after transmission of the NOTIFICATION RESPONSE message for which UE 110 may memorize or otherwise store information regarding the situation and be prepared to use either the first or the second proposed scheme. The duration of the timer may be fixed, dedicated by UE 110, dynamically defined by wireless network 120 (e.g., indicated by wireless network 120 to UE 110 in downlink (DL) signaling), or previously provisioned by wireless network 120 and saved to a universal integrated circuit card (UICC) or a permanent memory of UE 110.

Illustrative Implementations

Figure 2:
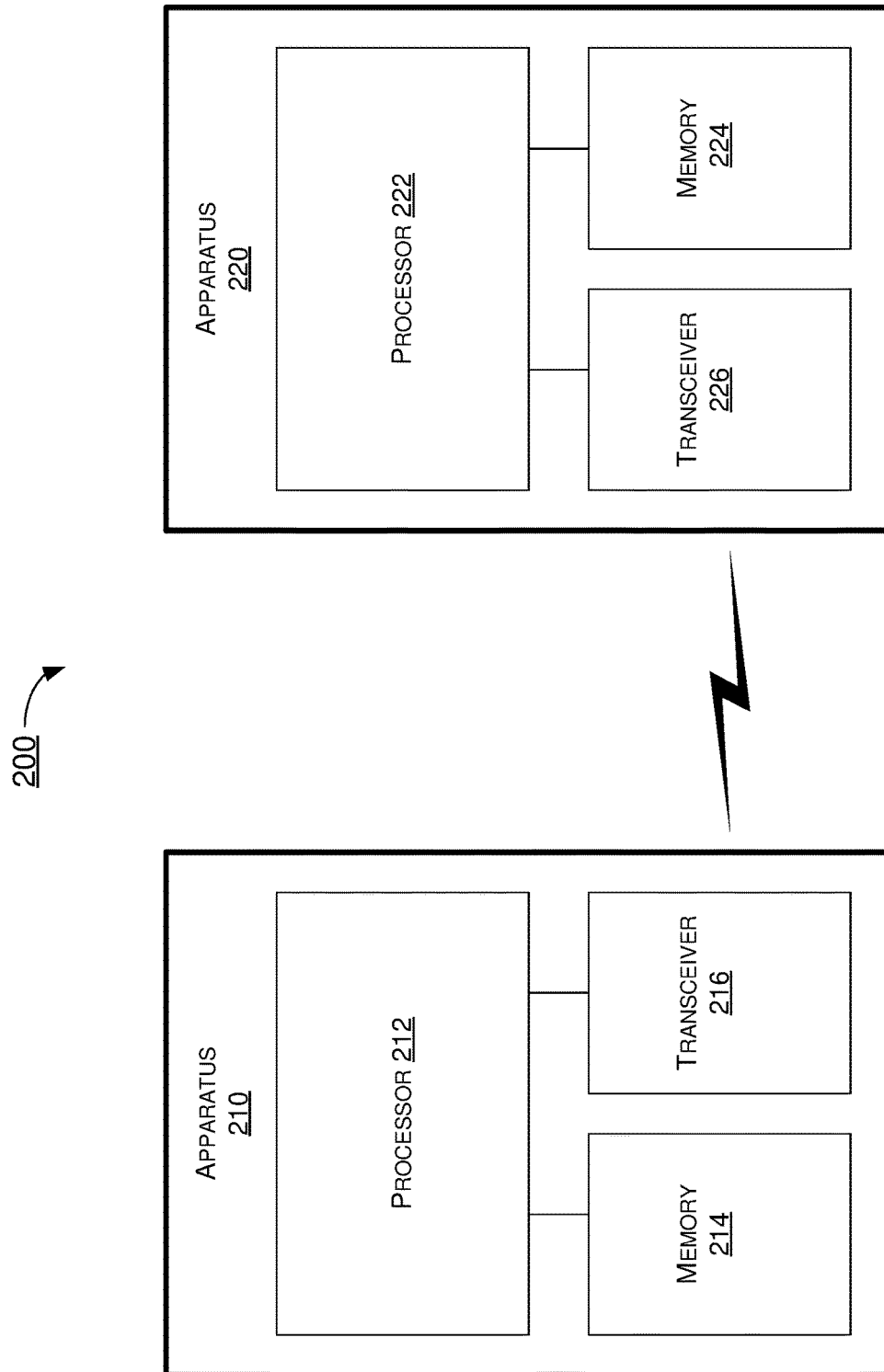
FIG. 2 is a block diagram of an example communication system in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to UE reachability after notification in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to UE reachability after notification in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory. Alternatively, or additionally, each of memory 214 and memory 224 may include a UICC.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., wireless network 120), is provided below.

In one aspect of UE reachability after notification in mobile communications in accordance with the present disclosure, processor 212 of apparatus 210, implemented in or as UE 110, may receive, via transceiver 216, an indication to initiate a notification procedure from a network (e.g., via apparatus 220 as network node 125) over a non-3GPP access while a 3GPP access with the network is unavailable. Additionally, processor 212 may transmit, via transceiver 216, a notification response message to the network (e.g., via apparatus 220) responsive to the receiving. Moreover, processor 212 may, after the 3GPP access with the network becomes available, indicate, via transceiver 216, to the network (e.g., via apparatus 220) that apparatus 210 is reachable over the 3GPP access.

In some implementations, in indicating to the network that apparatus 210 is reachable over the 3GPP access, processor 212 may perform certain operations. For instance, processor 212 may enter a state of 5GMM-REGISTERED-.NORMAL-SERVICE over the 3GPP access. Moreover, processor 212 may initiate a connection establishment procedure over the 3GPP access.

In some implementations, in initiating the connection establishment procedure, processor 212 may initiate a registration procedure for mobility and periodic registration update by transmitting a registration request message to the network over the 3GPP access.

In some implementations, in initiating the connection establishment procedure, processor 212 may transmit a service request message to the network over the 3GPP access.

In some implementations, processor 212 may further store, in memory 214, information indicating that the notification procedure has been performed and that the notification response has been transmitted. In some implementations, in storing the information, processor 212 may store the information for a duration which is fixed, determined by the apparatus, defined by the network in a DL signaling, or provisioned by the network previously and stored in memory 214.

In another aspect of UE reachability after notification in mobile communications in accordance with the present disclosure, processor 212 of apparatus 210, implemented in or as UE 110, may receive, via transceiver 216, an indication to initiate a notification procedure from a network (e.g., via apparatus 220 as network node 125) over a non-3GPP access while a 3GPP access with the network is unavailable. Additionally, processor 212 may transmit, via transceiver 216, a notification response message to the network (e.g., via apparatus 220) responsive to the receiving. Moreover, processor 212 may, after the 3GPP access with the network becomes available, indicate, via transceiver 216, to the network (e.g., via apparatus 220) over the non-3GPP access that apparatus 210 is reachable over the 3GPP access.

In some implementations, the indication message may include any of the following: (1) a notification response message with a new IE or a modified existing IE indicating that the 3GPP access has returned to a state in which apparatus 210 is reachable; (2) a preexisting type of message which is extended or modified to serve a purpose of indicating that the 3GPP access has returned to a state in which apparatus 210 is reachable; or (3) a new type of message which is defined to serve a purpose of indicating that the 3GPP access has returned to a state in which apparatus 210 is reachable.

In some implementations, processor 212 may further store, in memory 214, information indicating that the notification procedure has been performed and that the notification response has been transmitted. In some implementations, in storing the information, processor 212 may store the information for a duration which is fixed, determined by the apparatus, defined by the network in a DL signaling, or provisioned by the network previously and stored in memory 214.

In yet another aspect of UE reachability after notification in mobile communications in accordance with the present disclosure, processor 212 of apparatus 210, implemented in or as UE 110, may receive, via transceiver 216, an indication to initiate a notification procedure from a network (e.g., via apparatus 220 as network node 125) over a first type of access while a second type of access with the network is unavailable. Process 500 may proceed from 510 to 520. Moreover, processor 212 may transmit, via transceiver 216, a response message to the network (e.g., via apparatus 220) responsive to the receiving. Furthermore, processor 212 may, after the second type of access with the network becomes available, indicate, via transceiver 216, to the network (e.g., via apparatus 220) that apparatus 210 is reachable over the second type of access regardless of a need for signaling over the second type of access.

In some implementations, the first type of access may include a non-3GPP access, and the second type of access may include a 3GPP access.

In some implementations, in receiving the indication to initiate the procedure, processor 212 may receive an indication to initiate a notification procedure when apparatus 210 is in a 5GMM-CONNECTED mode over the non-3GPP access and a 5GMM-IDLE mode over the 3GPP access. Moreover, in transmitting of the response message, processor 212 may transmit a notification response message.

In some implementations, in indicating to the network that apparatus 210 is reachable over the 3GPP access, processor 212 may perform certain operations. For instance, processor 212 may enter a state of 5GMM-REGISTERED-.NORMAL-SERVICE over the 3GPP access. Moreover, processor 212 may initiate a registration procedure for mobility and periodic registration update by transmitting a registration request message to the network over the 3GPP access.

In some implementations, in receiving the indication to initiate the procedure, processor 212 may receive an indication to initiate a notification procedure. Moreover, in transmitting the response message, processor 212 may transmit a notification response message.

In some implementations, in indicating to the network that apparatus 210 is reachable over the 3GPP access, processor 212 may indicate to the network that apparatus 210 is reachable over the 3GPP access while there is no need of NAS signaling over the 3GPP access.

In some implementations, in indicating to the network that apparatus 210 is reachable over the 3GPP access, processor 212 may indicate by using a first process or a second process based on at least status of the non-3GPP access.

In some implementations, the non-3GPP access may be in an idle mode when the 3GPP access becomes available. Accordingly, in indicating by using the first process, processor 212 may initiate a connection establishment procedure over the 3GPP access. In some implementations, in initiating the connection establishment procedure over the 3GPP access, processor 212 may transmit a registration request message or a service request message to the network over the 3GPP access.

In some implementations, the non-3GPP access may be in a connected mode. Accordingly, in indicating by using the second process, processor 212 may indicate to the network that apparatus 210 is reachable by transmitting a message over the non-3GPP access.

Illustrative Processes

FIG. 3 illustrates an example process 300 in accordance with an implementation of the present disclosure. Process 300 may represent an aspect of implementing various proposed designs, concepts, schemes, systems and methods described above, whether partially or entirely, including those described above. More specifically, process 300 may represent an aspect of the proposed concepts and schemes pertaining to UE reachability after notification in mobile communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210, implemented in or as UE 110, receiving, via transceiver 216, an indication to initiate a notification procedure from a network (e.g., via apparatus 220 as network node 125) over a non-3GPP access while a 3GPP access with the network is unavailable. Process 300 may proceed from 310 to 320.

At 320, process 300 may involve processor 212 transmitting, via transceiver 216, a notification response message to the network (e.g., via apparatus 220) responsive to the receiving. Process 300 may proceed from 320 to 330.

At 330, process 300 may involve processor 212, after the 3GPP access with the network becomes available, indicating, via transceiver 216, to the network (e.g., via apparatus 220) that apparatus 210 is reachable over the 3GPP access.

In some implementations, in indicating to the network that apparatus 210 is reachable over the 3GPP access, process 300 may involve processor 212 performing certain operations. For instance, process 300 may involve processor 212 entering a state of 5GMM-REGISTERED.NORMAL-SERVICE over the 3GPP access. Moreover, process 300 may involve processor 212 initiating a connection establishment procedure over the 3GPP access.

In some implementations, in initiating the connection establishment procedure, process 300 may involve processor 212 initiating a registration procedure for mobility and periodic registration update by transmitting a registration request message to the network over the 3GPP access.

In some implementations, in initiating the connection establishment procedure, process 300 may involve processor 212 transmitting a service request message to the network over the 3GPP access.

In some implementations, process 300 may further involve processor 212 storing, in memory 214, information indicating that the notification procedure has been performed and that the notification response has been transmitted. In some implementations, in storing the information, process 300 may involve processor 212 storing the information for a duration which is fixed, determined by the apparatus, defined by the network in a DL signaling, or provisioned by the network previously and stored in memory 214.

FIG. 4 illustrates an example process 400 in accordance with an implementation of the present disclosure. Process 400 may represent an aspect of implementing various proposed designs, concepts, schemes, systems and methods described above, whether partially or entirely, including those described above. More specifically, process 400 may represent an aspect of the proposed concepts and schemes pertaining to UE reachability after notification in mobile communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., network node 125) of a wireless network (e.g., wireless network 120). Process 400 may begin at block 410.

At 410, process 400 may involve processor 212 of apparatus 210, implemented in or as UE 110, receiving, via transceiver 216, an indication to initiate a notification procedure from a network (e.g., via apparatus 220 as network node 125) over a non-3GPP access while a 3GPP access with the network is unavailable. Process 400 may proceed from 410 to 420.

At 420, process 400 may involve processor 212 transmitting, via transceiver 216, a notification response message to the network (e.g., via apparatus 220) responsive to the receiving. Process 400 may proceed from 420 to 430.

At 430, process 400 may involve processor 212, after the 3GPP access with the network becomes available, indicating, via transceiver 216, to the network (e.g., via apparatus 220) over the non-3GPP access that apparatus 210 is reachable over the 3GPP access.

In some implementations, the indication message may include any of the following: (1) a notification response message with a new IE or a modified existing IE indicating that the 3GPP access has returned to a state in which apparatus 210 is reachable; (2) a preexisting type of message which is extended or modified to serve a purpose of indicating that the 3GPP access has returned to a state in which apparatus 210 is reachable; or (3) a new type of message which is defined to serve a purpose of indicating that the 3GPP access has returned to a state in which apparatus 210 is reachable.

In some implementations, process 400 may further involve processor 212 storing, in memory 214, information indicating that the notification procedure has been performed and that the notification response has been transmitted. In some implementations, in storing the information, process 400 may involve processor 212 storing the information for a duration which is fixed, determined by the apparatus, defined by the network in a DL signaling, or provisioned by the network previously and stored in memory 214.

Figure 5:
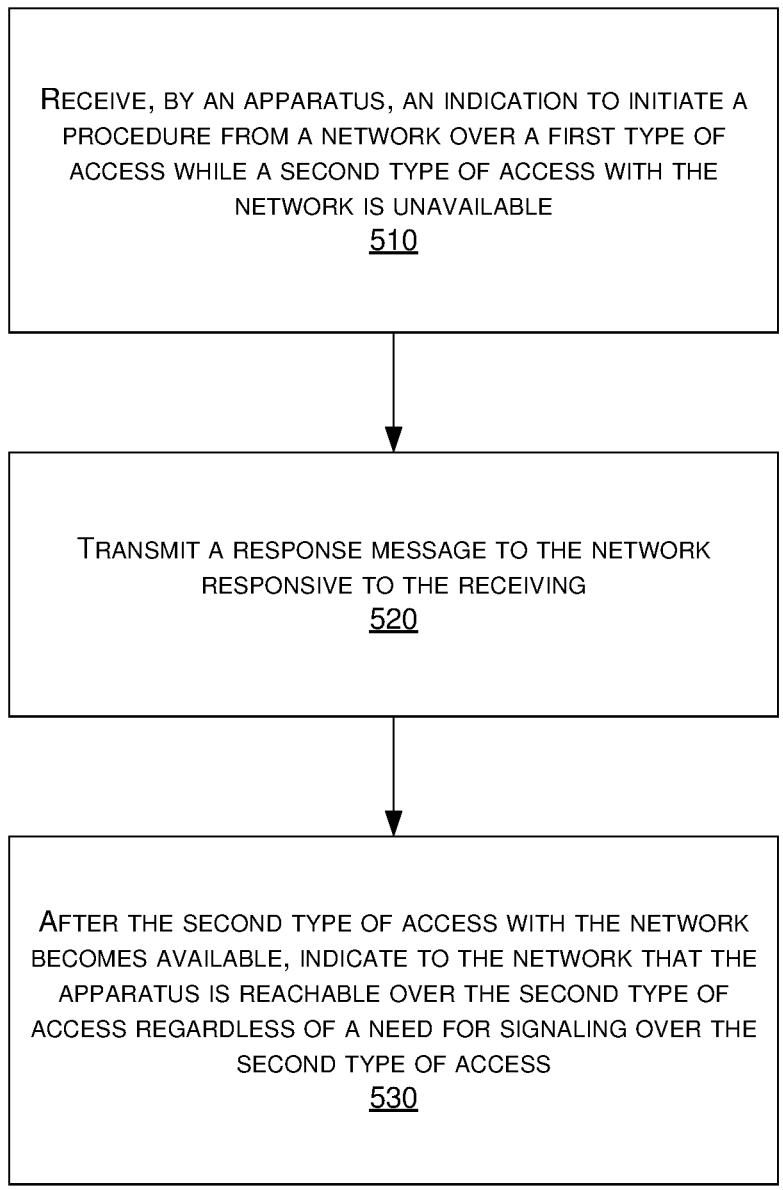
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those described above. More specifically, process 500 may represent an aspect of the proposed concepts and schemes pertaining to UE reachability after notification in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 210 and apparatus 220 as well as any variations thereof. Solely for illustrative purposes and without limiting the scope, process 500 is described below in the context of apparatus 210 as a UE (e.g., UE 110) and apparatus 220 as a communication entity such as a network node or base station (e.g., network node 125) of a wireless network (e.g., wireless network 120). Process 500 may begin at block 510.

At 510, process 500 may involve processor 212 of apparatus 210, implemented in or as UE 110, receiving, via transceiver 216, an indication to initiate a procedure from a network (e.g., via apparatus 220 as network node 125) over a first type of access while a second type of access with the network is unavailable. Process 500 may proceed from 510 to 520.

At 520, process 500 may involve processor 212 transmitting, via transceiver 216, a response message to the network (e.g., via apparatus 220) responsive to the receiving. Process 500 may proceed from 520 to 530.

At 530, process 500 may involve processor 212, after the second type of access with the network becomes available, indicating, via transceiver 216, to the network (e.g., via apparatus 220) that apparatus 210 is reachable over the second type of access regardless of a need for signaling over the second type of access.

In some implementations, the first type of access may include a non-3GPP access, and the second type of access may include a 3GPP access.

In some implementations, in receiving the indication to initiate the procedure, process 500 may involve processor 212 receiving an indication to initiate a notification procedure when apparatus 210 is in a 5GMM-CONNECTED mode over the non-3GPP access and a 5GMM-IDLE mode over the 3GPP access. Moreover, in transmitting of the response message, process 500 may involve processor 212 transmitting a notification response message.

In some implementations, in indicating to the network that apparatus 210 is reachable over the 3GPP access, process 500 may involve processor 212 performing certain operations. For instance, process 500 may involve processor 212 entering a state of 5GMM-REGISTERED.NORMAL-SERVICE over the 3GPP access. Moreover, process 500 may involve processor 212 initiating a registration procedure for mobility and periodic registration update by transmitting a registration request message to the network over the 3GPP access.

In some implementations, in receiving the indication to initiate the procedure, process 500 may involve processor 212 receiving an indication to initiate a notification procedure. Moreover, in transmitting the response message, process 500 may involve processor 212 transmitting a notification response message.

In some implementations, in indicating to the network that apparatus 210 is reachable over the 3GPP access, process 500 may involve processor 212 indicating to the network that apparatus 210 is reachable over the 3GPP access while there is no need of NAS signaling over the 3GPP access.

In some implementations, in indicating to the network that apparatus 210 is reachable over the 3GPP access, process 500 may involve processor 212 indicating by using a first process or a second process based on at least status of the non-3GPP access.

In some implementations, the non-3GPP access may be in an idle mode when the 3GPP access becomes available. Accordingly, in indicating by using the first process, process 500 may involve processor 212 initiating a connection establishment procedure over the 3GPP access. In some implementations, in initiating the connection establishment procedure over the 3GPP access, process 500 may involve processor 212 transmitting a registration request message or a service request message to the network over the 3GPP access.

In some implementations, the non-3GPP access may be in a connected mode. Accordingly, in indicating by using the second process, process 500 may involve processor 212 indicating to the network that apparatus 210 is reachable by transmitting a message over the non-3GPP access.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, an indication to initiate a notification procedure from a network over a non-3$^{rd}$ Generation Partnership Project (non-3GPP) access while a 3GPP access with the network is unavailable;
   transmitting, by the processor, a notification response message to the network responsive to the receiving; and
   after the 3GPP access with the network becomes available, indicating, by the processor, to the network that the apparatus is reachable over the 3GPP access,
   wherein the indicating to the network that the apparatus is reachable over the 3GPP access comprises indicating to the network that the apparatus is reachable over the 3GPP access while there is no need of non-access stratum (NAS) signaling over the 3GPP access.

2. The method of claim 1, wherein the indicating to the network that the apparatus is reachable over the 3GPP access comprises:
   entering a state of 5GMM-REGISTERED.NORMAL-SERVICE over the 3GPP access; and
   initiating a connection establishment procedure over the 3GPP access.

3. The method of claim 2, wherein the initiating of the connection establishment procedure comprises initiating a registration procedure for mobility and periodic registration update by transmitting a registration request message to the network over the 3GPP access.

4. The method of claim 2, wherein the initiating of the connection establishment procedure comprises transmitting a service request message to the network over the 3GPP access.

5. The method of claim 1, further comprising:
   storing, by the processor, information indicating that the notification procedure has been performed and that the notification response has been transmitted.

6. The method of claim 5, wherein the storing of the information comprises storing the information for a duration which is fixed, determined by the apparatus, defined by the network in a downlink (DL) signaling, or provisioned by the network previously and stored in a universal integrated circuit card (UICC) or memory of the apparatus.

7. A method, comprising:
receiving, by a processor of an apparatus, an indication to initiate a notification procedure from a network over a non-3$^{rd}$ Generation Partnership Project (non-3GPP) access a while a 3GPP access with the network is unavailable;
transmitting, by the processor, a notification response message to the network responsive to the receiving; and
after the 3GPP access with the network becomes available, transmitting, by the processor, an indication message to the network over the non-3GPP access that the apparatus is reachable over the 3GPP access,
wherein the transmitting of the indication message to the network over the non-3GPP access that the apparatus is reachable over the 3GPP access comprises transmitting the indication message to the network that the apparatus is reachable over the 3GPP access while there is no need of non-access stratum (NAS) signaling over the 3GPP access.

8. The method of claim 7, wherein the indication message comprises any of:
a notification response message with a new information element (IE) or a modified existing IE indicating that the 3GPP access has returned to a state in which the apparatus is reachable;
a preexisting type of message which is extended or modified to serve a purpose of indicating that the 3GPP access has returned to a state in which the apparatus is reachable; or
a new type of message which is defined to serve a purpose of indicating that the 3GPP access has returned to a state in which the apparatus is reachable.

9. The method of claim 7, further comprising:
storing, by the processor, information indicating that the notification procedure has been performed and that the notification response has been transmitted.

10. The method of claim 9, wherein the storing of the information comprises storing the information for a duration which is fixed, determined by the apparatus, defined by the network in a downlink (DL) signaling, or provisioned by the network previously and stored in a universal integrated circuit card (UICC) or memory of the apparatus.

11. A method, comprising:
receiving, by a processor of an apparatus, an indication to initiate a procedure from a network over a first type of access, when there is downlink (DL) data for a protocol data unit (PDU) session associated with a second type of access to be transferred over the second type of access, while the second type of access with the network is unavailable;
transmitting, by the processor, a response message to the network responsive to the receiving; and
after the second type of access with the network becomes available, indicating, by the processor, to the network that the apparatus is reachable over the second type of access regardless of a need for signaling over the second type of access,
wherein the indicating to the network that the apparatus is reachable over the second type of access comprises indicating to the network that the apparatus is reachable over a 3$^{rd}$ Generation Partnership Project (3GPP) access while there is no need of non-access stratum (NAS) signaling over the 3GPP access.

12. The method of claim 11, wherein the first type of access comprises a non-3$^{rd}$ Generation Partnership Project (non-3GPP) access, and wherein the second type of access comprises a 3GPP access.

13. The method of claim 12, wherein the receiving of the indication to initiate the procedure comprises receiving an indication to initiate a notification procedure when the apparatus is in a 5$^{th}$ Generation (5G) Mobility Management (5GMM) connected (5GMM-CONNECTED) mode over the non-3GPP access and a 5GMM idle (5GMM-IDLE) mode over the 3GPP access, and wherein the transmitting of the response message comprises transmitting a notification response message.

14. The method of claim 13, wherein the indicating to the network that the apparatus is reachable over the 3GPP access comprises:
entering a state of 5GMM-REGISTERED.NORMAL-SERVICE over the 3GPP access; and
initiating a registration procedure for mobility and periodic registration update by transmitting a registration request message to the network over the 3GPP access.

15. The method of claim 11, wherein the receiving of the indication to initiate the procedure comprises receiving an indication to initiate a notification procedure, and wherein the transmitting of the response message comprises transmitting a notification response message.

16. The method of claim 11, wherein the indicating to the network that the apparatus is reachable over the second type of access comprises indicating by using a first process or a second process based on at least status of a non-3$^{rd}$ Generation Partnership Project (non-3GPP) access.

17. The method of claim 16, wherein the non-3GPP access is in an idle mode when a 3$^{rd}$ Generation Partnership Project (3GPP) access becomes available, and wherein the indicating by using the first process comprises initiating a connection establishment procedure over the 3GPP access.

18. The method of claim 17, wherein the initiating of the connection establishment procedure over the 3GPP access comprises transmitting a registration request message or a service request message to the network over the 3GPP access.

19. The method of claim 16, wherein the non-3GPP access is in a connected mode, and wherein the indicating by using the second process comprises indicating to the network that the apparatus is reachable by transmitting a message over the non-3GPP access.

* * * * *